US012656660B2

(12) United States Patent
Han et al.

(10) Patent No.: US 12,656,660 B2
(45) Date of Patent: Jun. 16, 2026

(54) CAMERA COMPRISING A LENS COVER HAVING A CONNECTION PORTION AND A LOCKING PORTION

(71) Applicant: Dongguan HDKing Smart Technology Co., LTD., Dongguan (CN)

(72) Inventors: Bolin Han, Dongguan (CN); Yongchun Ren, Dongguan (CN)

(73) Assignee: Dongguan HDKing Smart Technology Co., LTD., Donnguan (CN)

( * ) Notice: Subject to any disclaimer, the term of this patent is extended or adjusted under 35 U.S.C. 154(b) by 392 days.

(21) Appl. No.: 18/465,602

(22) Filed: Sep. 12, 2023

(65) Prior Publication Data

US 2025/0068037 A1 Feb. 27, 2025

(30) Foreign Application Priority Data

Aug. 25, 2023 (CN) .......................... 202322309324.0

(51) Int. Cl.
*G03B 17/12* (2021.01)
*G03B 11/04* (2021.01)
(52) U.S. Cl.
CPC ............ *G03B 17/12* (2013.01); *G03B 11/041* (2013.01)

(58) Field of Classification Search
CPC ..................................................... G03B 11/041
See application file for complete search history.

(56) References Cited

U.S. PATENT DOCUMENTS

| | | | | |
|---|---|---|---|---|
| 2009/0091827 A1* | 4/2009 | Gauger | ................ | G03B 11/041 |
| | | | | 359/511 |
| 2014/0255018 A1* | 9/2014 | Kaye | .................... | G03B 11/041 |
| | | | | 396/448 |
| 2015/0253531 A1* | 9/2015 | Hayashi | ............... | G03B 11/041 |
| | | | | 359/511 |
| 2018/0088443 A1* | 3/2018 | Riddiford | .............. | G03B 11/06 |

* cited by examiner

*Primary Examiner* — Paul C Lee

(57) ABSTRACT

The present disclosure provides a camera including a first shell, a lens, a lens cover and a sealing ring. The first shell is provided with a first connection portion and a first locking portion. A second connection portion and a second locking portion are arranged on an inner side wall of the lens cover. The first connection portion is slidably connected to the second connection portion. The sealing ring is arranged on the first shell around the lens in a surrounding manner and abuts against the lens cover. A lens cover of a camera provided by the present disclosure is easier to mount and remove. Connection and locking structures are simple and reliable. The lens cover is not easy to loosen or separate, and the lens cover also has good dustproof and waterproof effects.

16 Claims, 6 Drawing Sheets

1

1

20

1

1

1

CAMERA COMPRISING A LENS COVER HAVING A CONNECTION PORTION AND A LOCKING PORTION

CROSS-REFERENCE TO RELATED APPLICATIONS

The application claims priority of Chinese patent application CN2023223093240, filed on 2023 Aug. 25, which is incorporated herein by reference in its entireties.

TECHNICAL FIELD

The present disclosure relates to the technical field of photographic equipment, and in particular, to a camera.

BACKGROUND

For shutterbugs or professional photographers, cameras are indispensable tools. A camera body and a lens are relatively expensive, so protecting the lens of the camera is particularly important. In the prior art, most of lens covers use a structure in which a spring cooperates with a sliding block. A user can open the lens cover by pinching an edge of the lens cover with a hand. However, in this structure, the spring is easy to age, so that the lens cover is easy to loosen and separate, which greatly affects the protection of the lens.

SUMMARY

In order to overcome the shortcomings of the prior art, the present disclosure provides a camera.

The technical solution adopted by the present disclosure to solve the technical problem is as follows:

A camera includes a first shell, a lens arranged on the first shell, a lens cover and a sealing ring. The first shell is provided with a first connection portion and a first locking portion. A second connection portion and a second locking portion are arranged on an inner side wall of the lens cover. The first connection portion is slidably connected to the second connection portion. When the first locking portion is locked with the second locking portion, relative sliding between the first connection portion and the second connection portion is limited, so that the lens cover and the lens reach a locked state. When the first locking portion is separated from the second locking portion, the first connection portion and the second connection portion are allowed to slide relatively, so that the lens cover and the lens reach a released state; and the sealing ring is arranged on the first shell around the lens in a surrounding manner and abuts against the lens cover.

Further, the first locking portion includes a first locking block; the first locking block is arranged on the first shell; the second locking portion includes a second locking block; the second locking block is arranged on an inner side wall of the second shell; and the first locking block is locked with the second locking block.

Further, the lens cover includes a second shell; the second shell includes a central ring wall; the second connection portion includes a second sliding block arranged on the ring wall; one end of the second sliding block is provided with a stopper; a first sliding chute is formed between the second sliding block and an inner side wall of the lens cover; the first connection portion includes a first sliding block arranged on the first shell; and the first sliding block is arranged in the first sliding chute to abut against the stopper.

Further, a quantity of the first sliding block and a quantity of the second sliding block are plural, and each first sliding block corresponds to each second sliding block.

Further, a quantity of the first sliding block and a quantity of the second sliding block are each equal to 3, and the first sliding blocks and the second sliding blocks are arranged at equal intervals.

Further, a quantity of the first locking block and a quantity of the second locking block are plural, and each first locking block corresponds to each second locking block.

Further, a quantity of the first locking block and a quantity of the second locking block are each equal to 3, and the first locking blocks and the second locking blocks are arranged at equal intervals.

Further, a second sliding chute is further arranged on the inner side wall of the second shell; the first shell is further provided with a first convex block; and the first convex block is arranged in the second sliding chute.

Further, a quantity of the first second sliding chute and a quantity of the first convex block are plural, and each second sliding chute corresponds to each first convex block.

Further, a quantity of the second sliding chute and a quantity of the first convex block are equal to 2, and the second sliding chutes and the first convex blocks are arranged at equal intervals.

Further, the lens cover further includes a lens piece; the lens cover is provided with a lens hole; and the lens piece is covered at the lens hole.

Further, the lens cover further includes a first gasket; and the first gasket is arranged between the lens piece and the second shell.

Further, the lens cover further includes a second gasket; the second shell is provided with a gasket groove; the gasket groove is arranged around the ring wall in a surrounding manner; and the second gasket is arranged in the gasket groove.

Further, a friction portion is arranged on an outer side wall of the second shell.

Further, the friction portion includes a strip-like bulge; and a quantity of the strip-like bulge is plural.

Further, the strip-like bulges are uniformly distributed on the second shell.

Further, one end of the first sliding block is a first guide slope, and one end of the second sliding block is a second guide slope.

Further, two ends of the first locking block are provided with a first locking slope and a third guide slope; two ends of the second locking block are provided with a second locking slope and a fourth guide slope; and the first locking slope is engaged with the second locking slope.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
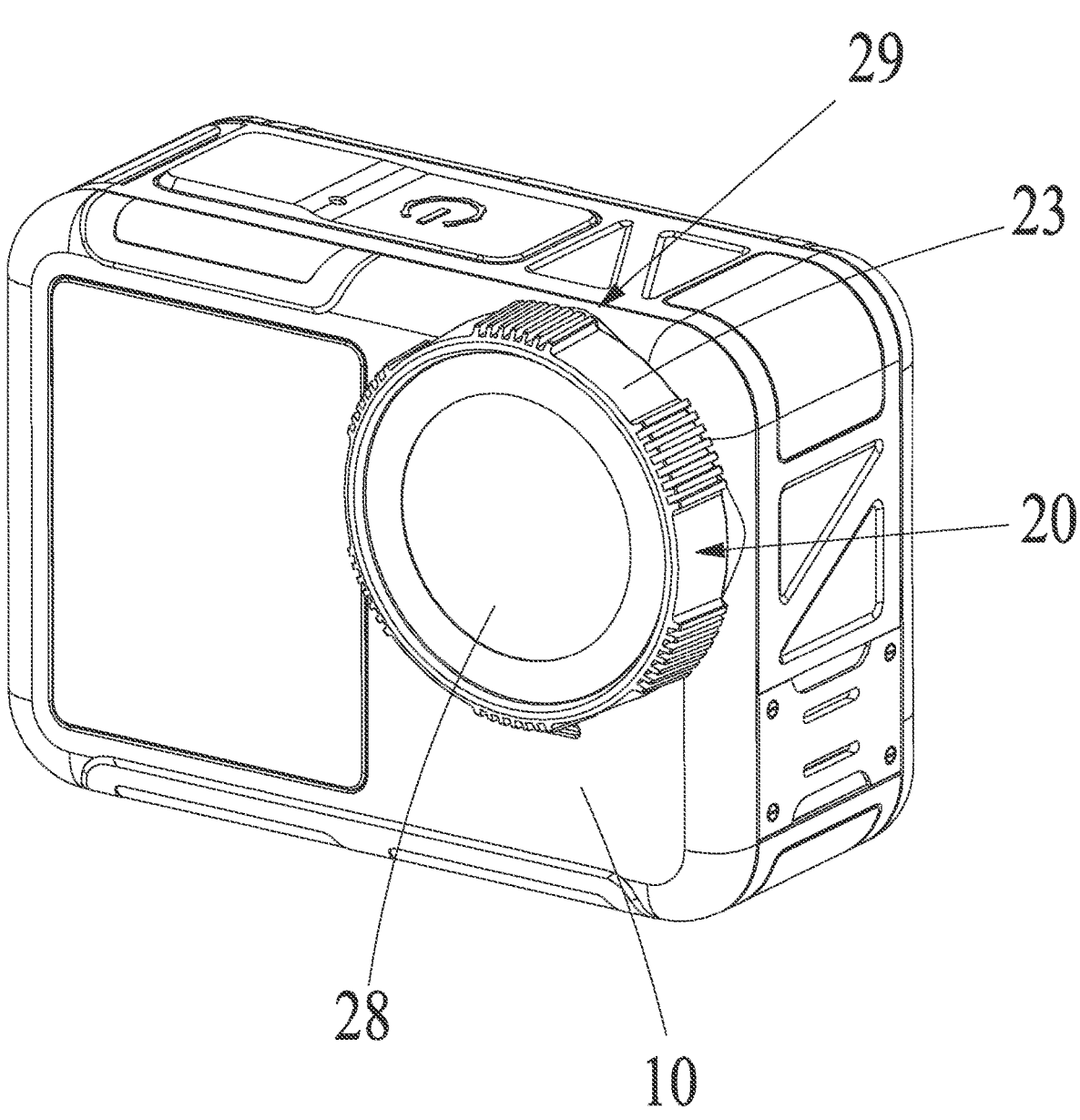
FIG. 1 is a schematic diagram of a three-dimensional structure of a camera.
Figure 2:
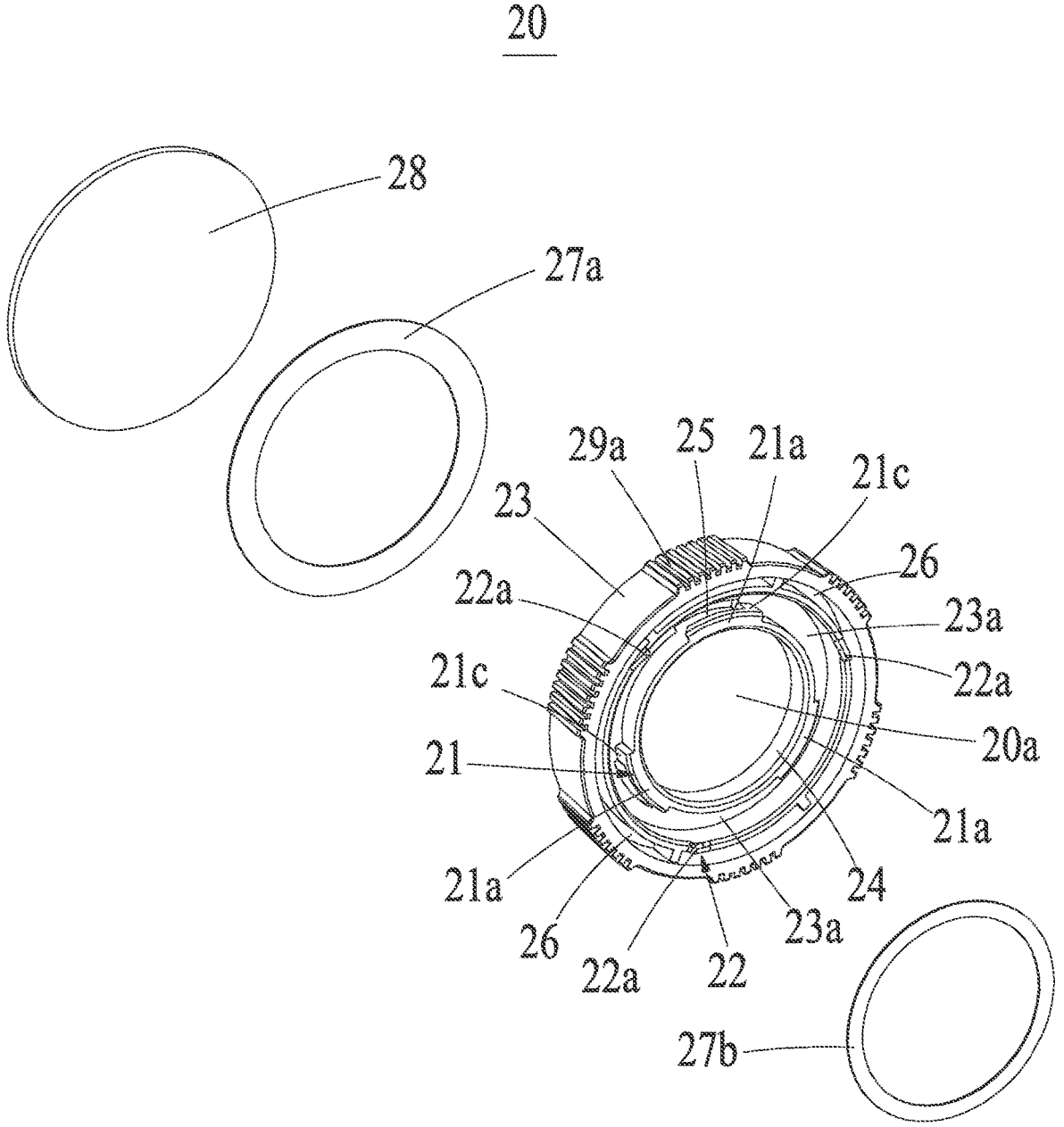
FIG. 2 is a three-dimensional exploded diagram of a lens cover.
Figure 3:
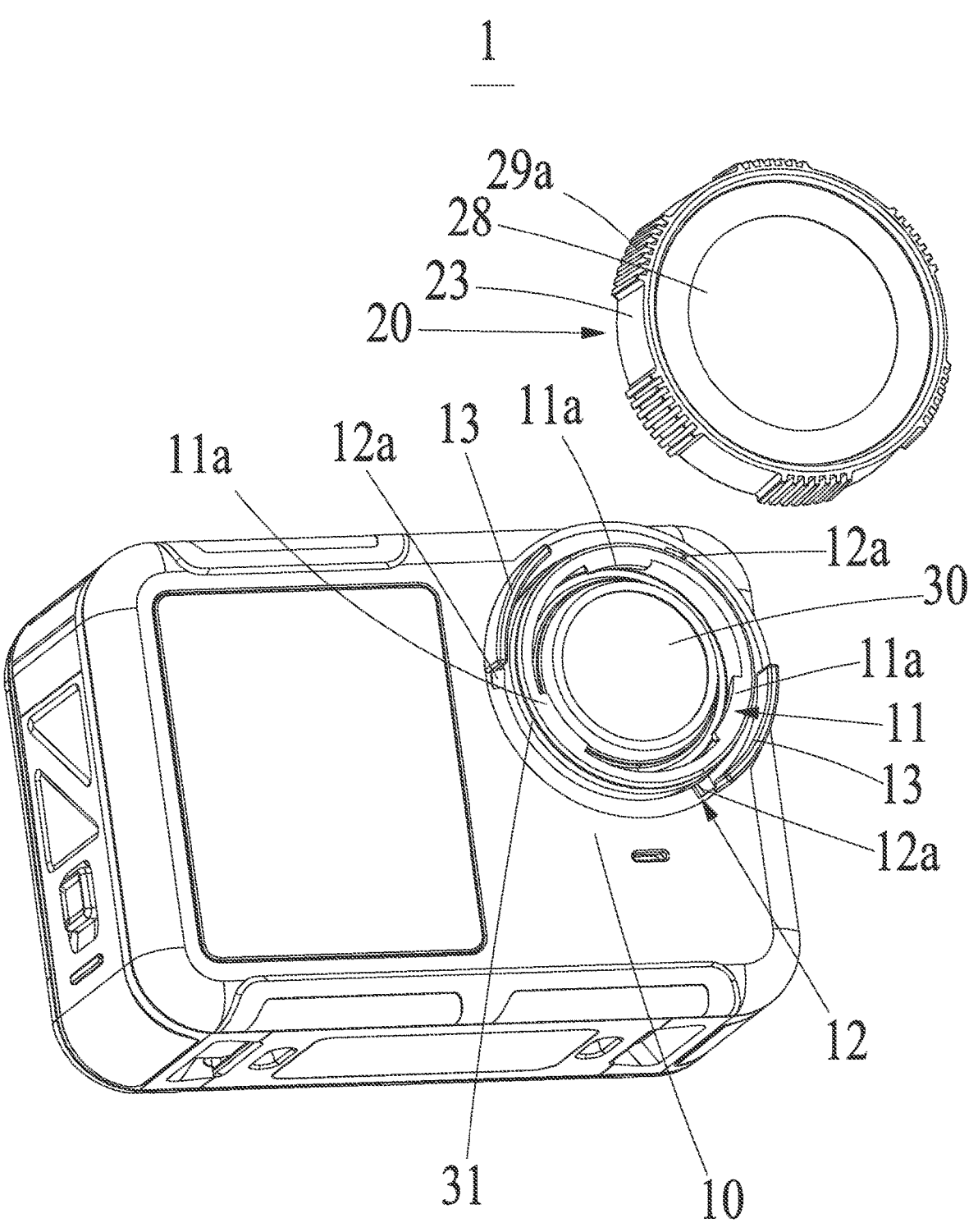
FIG. 3 is a three-dimensional exploded diagram of a camera.
Figure 4:
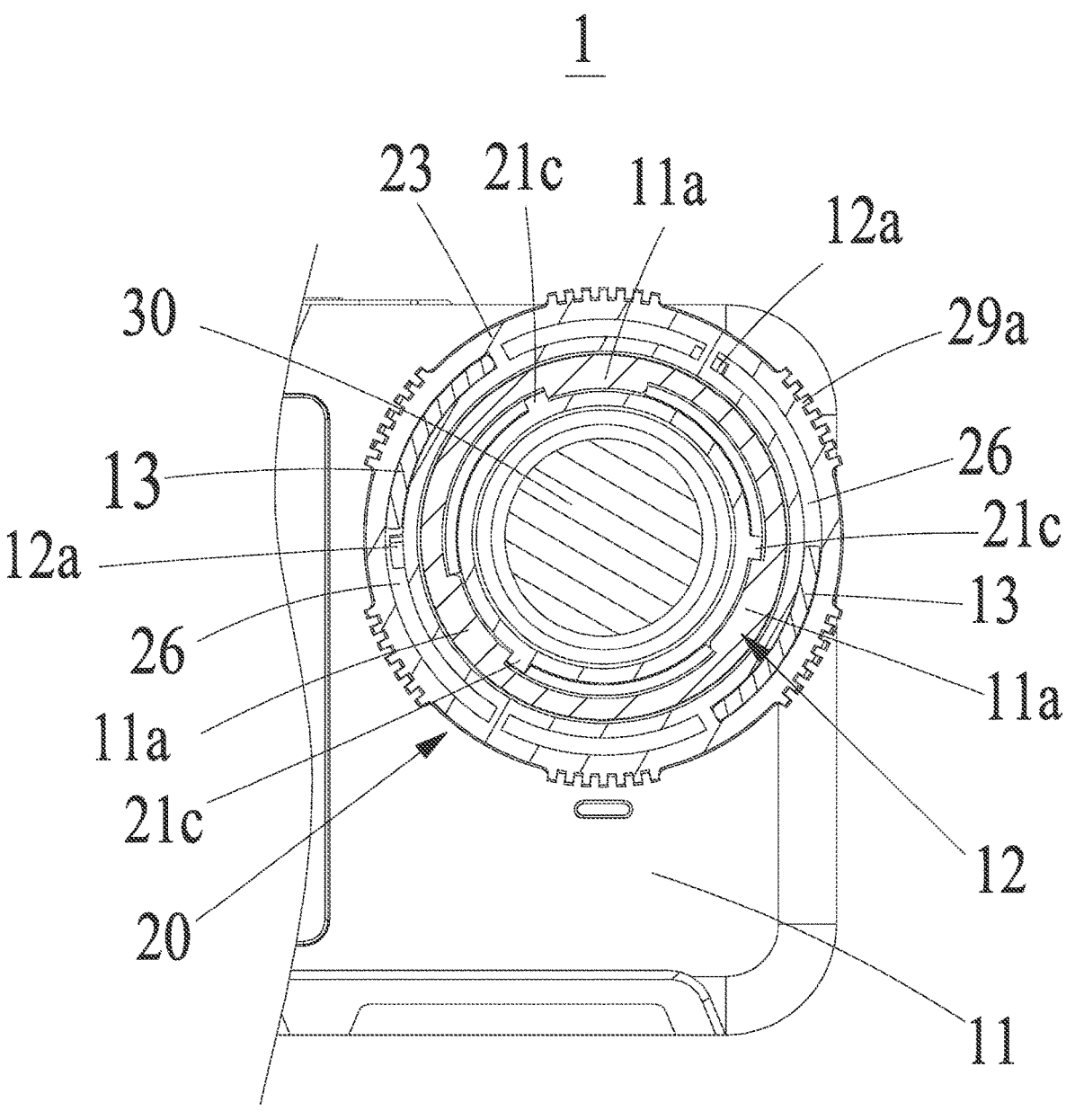
FIG. 4 is a sectional diagram of one part of the camera.
Figure 5:
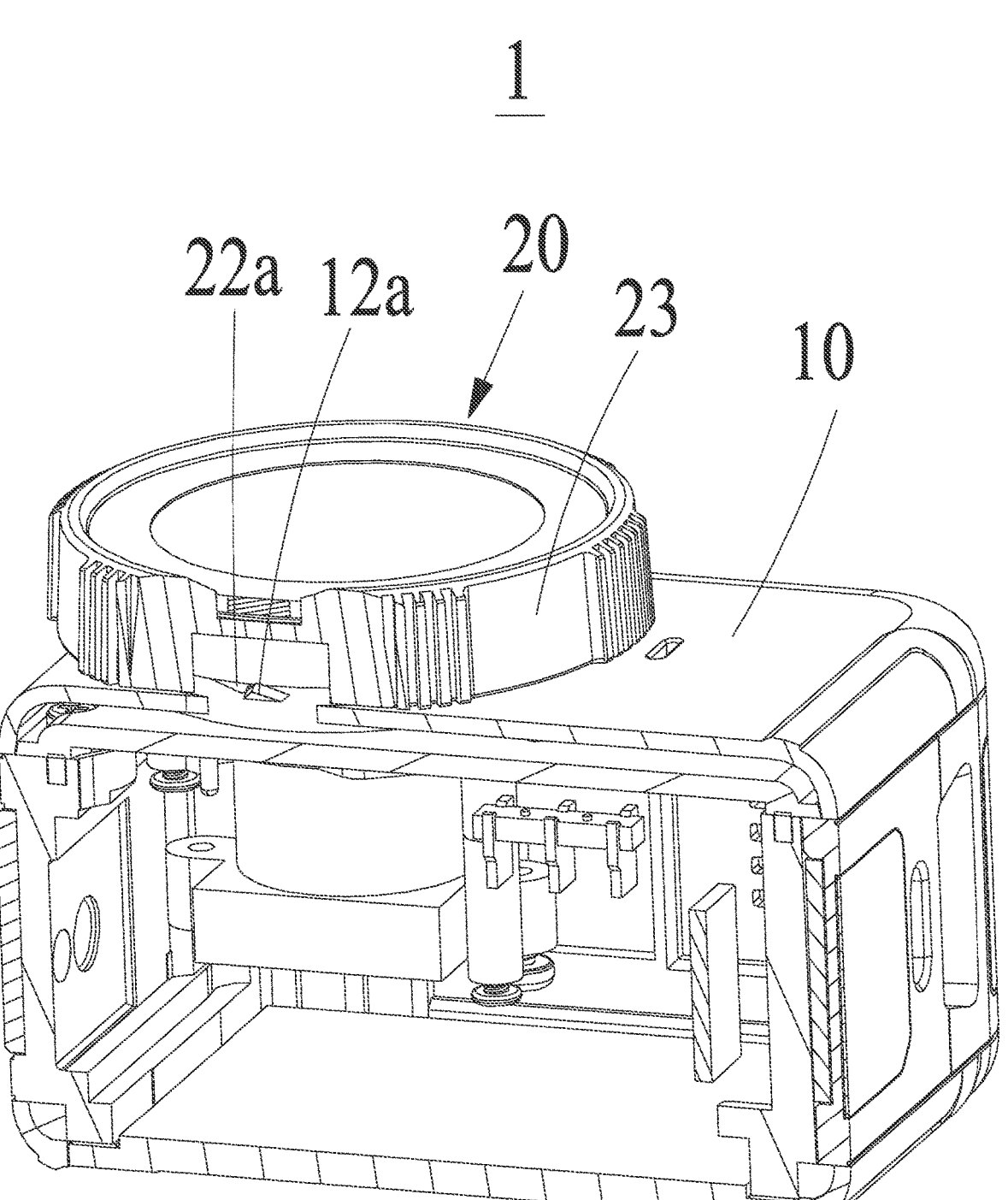
FIG. 5 is a sectional diagram of the camera in another view.
Figure 6:
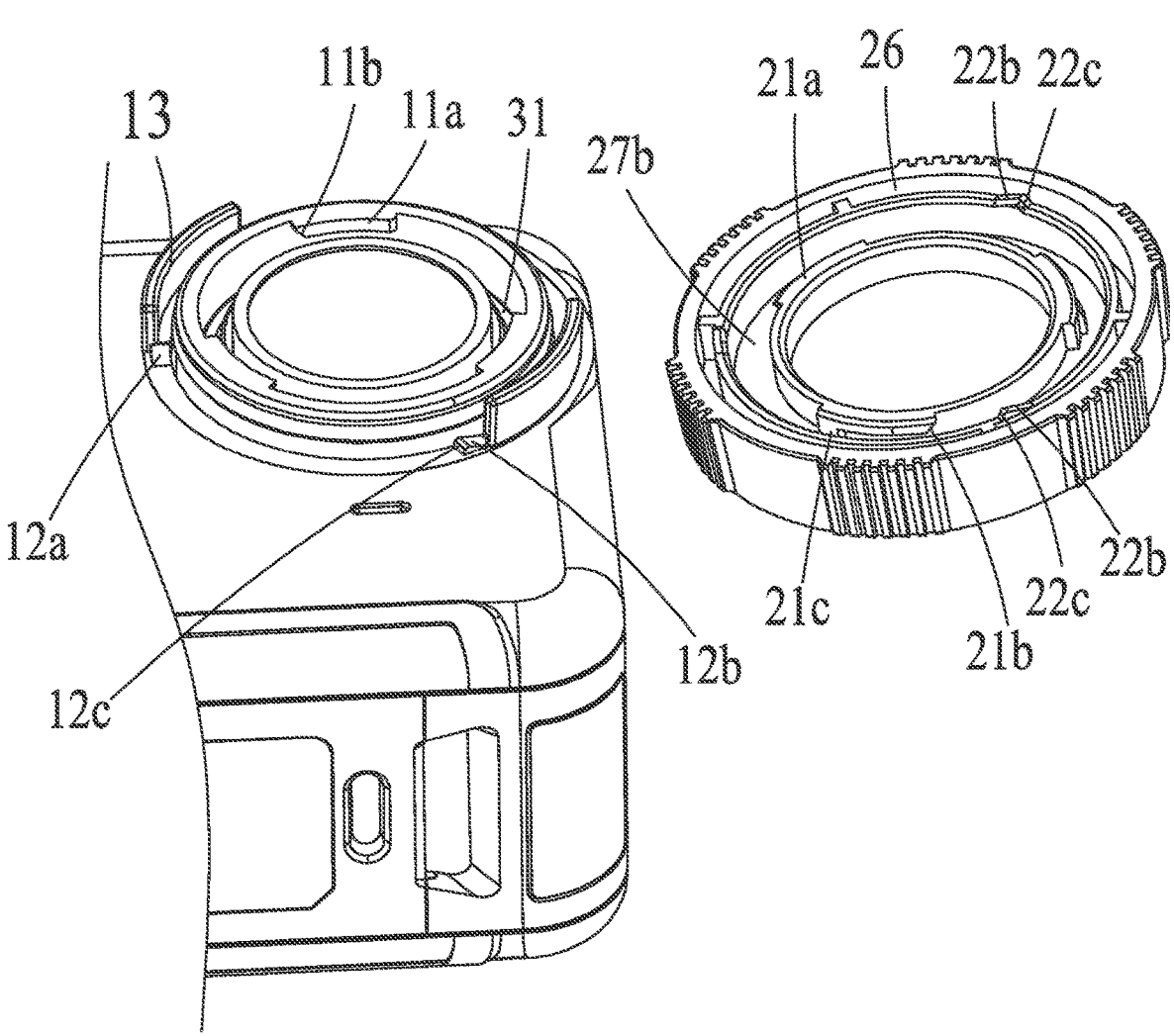
FIG. 6 is a three-dimensional exploded diagram of one part of the camera in another view.

Referring to FIG. 1 to FIG. 6, a camera 1 includes: a first shell 10, a lens 30 arranged on the first shell 10, a lens cover 20, and a sealing ring 31.

The first shell 10 is provided with a first connection portion 11 and a first locking portion 12. A second connection portion 21 and a second locking portion 22 are arranged on an inner side wall of the lens cover 20. The first connection portion 11 is slidably connected to the second connection portion 21. When the first locking portion 12 is locked with the second locking portion 22, relative sliding between the first connection portion 11 and the second connection portion 21 is limited, so that the lens cover 20 and the lens 30 reach a locked state. When the first locking portion 12 is separated from the second locking portion 22, the first connection portion 11 and the second connection portion 21 are allowed to slide relatively, so that the lens cover 20 and the lens 30 reach a released state.

The sealing ring 31 is arranged on the first shell 10 around the lens 30 in a surrounding manner and abuts against the lens cover 20.

It can be understood that the lens cover 20 is connected to the first connection portion 11 on the first shell 10 through the second connection portion 21. The lens cover 20 and the lens 30 are locked and released by locking and separation between the first locking portion 12 and the second locking portion 22. The lens cover 20 of this invention has easier mounting and replacement and replacement effects compared to the prior art. Connection and locking structures of the lens cover 20 are simpler and more practical, and occupy a small space. The lens cover 20 and the lens 30 are mounted smoothly and are removed easily. After the lens cover 20 and the lens 30 are locked, the lens cover is not easy to loosen or separate, which can better protect the lens 30.

The sealing ring 31 is made of a silicone material. The sealing ring 31 is arranged around the lens 30 in a surrounding manner and can play a dust-proof and waterproof role when used in conjunction with the lens cover 20, so that the camera 1 is caused to work safely at a certain water depth and within certain time. For example, in swimming, surfing, diving, and other sports, the camera 1 and the lens 30 can be protected from being damaged due to water ingress, which significantly improves the waterproof performance of the camera 1.

Further, the first locking portion 12 includes a first locking block 12a. The first locking block 12a is arranged on the first shell 10. The second locking portion 22 includes a second locking block 22a. The lens cover 20 includes a second shell 23. The second locking block 22a is arranged on an inner side wall of the second shell 23. The first locking block 12a is locked with the second locking block 22a.

It can be understood that the first locking portion 12 and the second locking portion 22 are locked through the first locking block 12a and the second locking block 22a, and the lens cover 20 is rotated to cause the first locking block 12a and the second locking block 22a to slide through. When the first locking block 12a is locked with the second locking block 22a, the lens cover 20 and the lens 30 reach a locked state.

Further, the second shell 23 includes a central ring wall 24. The second connection portion 21 includes a second sliding block 21a arranged on the ring wall 24. One end of the second sliding block 21a is provided with a stopper 21c. A first sliding chute 25 is formed between the second sliding block 21a and an inner side wall of the lens cover 20. The first connection portion 11 includes a first sliding block 11a arranged on the first shell 10. The first sliding block 11a is arranged in the first sliding chute 25 to abut against the stopper 21c.

It can be understood that during mounting of the lens cover 20, the first sliding block 11a slides in the first sliding chute 25 until the first locking block 12a and the second locking block 22a slide over each other, and the first sliding block 11a abuts against the stopper 21c. In this case, the first locking block 12a is locked with the second sliding block 21a. The stopper 21c can prevent the first sliding block 11a from sliding out of the first sliding chute 25.

Further, a quantity of the first sliding block 11a and a quantity of the second sliding block 21a are plural, and each first sliding block 11a corresponds to each second sliding block 21a.

It can be understood that the plurality of first sliding blocks 11a and the plurality of second sliding blocks 21a can be more stable during locking.

Further, a quantity of the first sliding block 11a and a quantity of the second sliding block 21a are each equal to 3, and the first sliding blocks and the second sliding blocks are arranged at equal intervals.

It can be understood that distances between the three first sliding blocks 11a and the three second sliding blocks 21a are equal, forming a triangular shape. A regular arrangement can further improve the stability during locking.

Further, a quantity of the first locking block 12a and a quantity of the second locking block 22a are plural, and each first locking block 12a corresponds to each second locking block 22a.

It can be understood that the plurality of first locking blocks 12a and the plurality of second locking blocks 22a are locked, which can improve the stability during locking of the lens cover 20 and the lens 30, so that the lens cover 20 is not easy to loosen and separate.

Further, a quantity of the first locking block 12a and a quantity of the second locking block 22a are each equal to 3, and the first locking blocks and the second locking blocks are arranged at equal intervals.

It can be understood that the three first locking blocks 12 are arranged at equal intervals, and the three second locking blocks 22a are arranged at equal intervals, which can further improve the stability of locking.

Further, a second sliding chute 26 is further arranged on the inner side wall of the second shell 23. The first shell 10 is further provided with a first convex block 13. The first convex block 13 is arranged in the second sliding chute 26.

It can be understood that the first convex block 13 can be plugged into the second sliding chute 26. When the lens cover 20 is used to cover the lens 30, a position can be found more accurately.

Further, a quantity of the first second sliding chute 26 and a quantity of the first convex block 13 are plural, and each second sliding chute 26 corresponds to each first convex block 13.

It can be understood that each second sliding chute 26 corresponds to one first convex block 13 for use. Both the second sliding chute 26 and the first convex block 13 are arc-shaped and have the same curvature, which can improve the smoothness and stability during rotation.

Further, a quantity of the second sliding chute 26 and a quantity of the first convex block 13 are equal to 2, and the second sliding chutes and the first convex blocks are arranged at equal intervals.

It can be understood that the two second sliding chutes 26 and the two first convex blocks 13 are arranged at intervals, which can further improve the stability of connection between the lens cover 20 and the first shell 10.

Further, the lens cover 20 further includes a lens piece 28. The lens cover 20 provided with a lens hole 20*a*, and the lens piece 28 is covered at the lens hole 20*a*.

It can be understood that the lens piece 28 is covered at the lens hole 20*a*, which can protect the lens 30 and improve the light transmittance.

Further, the lens cover 20 further includes a first gasket 27*a*. The first gasket 27*a* is arranged between the lens piece 28 and the second shell 23.

It can be understood that the first gasket 27*a* is mounted between the lens piece 28 and the second shell 23, which can play a buffering and waterproof role and also protect the lens piece 28 from being worn out by the second shell 23.

Further, the lens cover 20 further comprises a second gasket 27*b*. The second shell 23 is provided with a gasket groove 23*a*. The gasket groove 23*a* is arranged around the ring wall 24 in a surrounding manner, and the second gasket 27*b* is arranged in the gasket groove 23*a*.

It can be understood that the second gasket 27*b* can play a buffering role during the mounting of the lens cover 20 and the first shell 10, while making the lens cover 20 and the first shell 10 mounted more tightly.

Further, a friction portion 29 is arranged on an outer side wall of the second shell 23.

It can be understood that the friction portion 29 is arranged on the outer side wall of the second shell 23, which can increase a friction force of the lens cover 20 and facilitate rotation.

Further, the friction portion 29 includes a strip-like bulge 29*a*, and a quantity of the strip-like bulge 29*a* is plural.

It can be understood that the multiple strip-like bulge 29*a* can not only increase the friction force, but also improve the strength of the second shell 23.

Further, the strip-like bulges 29*a* are uniformly distributed on the second shell 23.

It can be understood that the strip-like bulges 29*a* are uniformly distributed, so that a user can touch the strip-like bulges 29*a* at every position, which not only improves the practicality but also beautifies the appearance.

Further, one end of the first sliding block 11*a* is a first guide slope 11*b*, and one end of the second sliding block 21*a* is a second guide slope 21*b*.

It can be understood that during mounting of the lens cover 20, when the first guide slope 11*b* and the second guide slope 21*b* come into contact, making it easier for the first sliding block 11*a* to enter the first sliding chute 25 and facilitating the mounting.

Further, two ends of the first locking block 12*a* are provided with a first locking slope 12*c* and a third guide slope 12*b*. Two ends of the second locking block 22*a* are provided with a second locking slope 22*c* and a fourth guide slope 22*b*. The first locking slope 12*c* is engaged with the second locking slope 22*c*.

It can be understood that a slope gradient of the third guide slope 12*b* is less than that of the first locking slope 12*c*, and a slope gradient of the fourth guide slope 22*b* is less than that of the second locking slope 22*c*. When the third guide slope 12*b* with the relatively small slope gradient and the fourth guide slope 22*b* with the relatively small slope gradient come into contact, the first locking block 12*a* and the second locking block 22*a* easily slide over each other, and the user uses less effort to mount the lens 30. Meanwhile, the first locking slope 12*c* with the relatively large slope gradient and the second locking slope 22*c* with the relatively large slope gradient abut against each other, so that the first locking block 12*a* and the second locking block 22*a* can be engaged more tightly.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A camera, comprising a first shell, a lens arranged on the first shell, a lens cover, and a sealing ring,
   wherein the first shell is provided with a first connection portion and a first locking portion; a second connection portion and a second locking portion are arranged on an inner side wall of the lens cover; the first connection portion is slidably connected to the second connection portion; when the first locking portion is locked with the second locking portion, relative sliding between the first connection portion and the second connection portion is limited, so that the lens cover and the lens reach a locked state; when the first locking portion is separated from the second locking portion, the first connection portion and the second connection portion are allowed to slide relatively, so that the lens cover and the lens reach a released state; and
   the sealing ring is arranged on the first shell around the lens in a surrounding manner and abuts against the lens cover;
   wherein the first locking portion comprises a first locking block; the first locking block is arranged on the first shell; the second locking portion comprises a second locking block; the lens cover comprises a second shell; the second locking block is arranged on an inner side wall of the second shell; and the first locking block is locked with the second locking block;
   wherein the second shell comprises a central ring wall; the second connection portion comprises a second sliding block arranged on the ring wall; one end of the second sliding block is provided with a stopper; a first sliding chute is formed between the second sliding block and an inner side wall of the lens cover; the first connection portion comprises a first sliding block arranged on the first shell; and the first sliding block is arranged in the first sliding chute to abut against the stopper.

2. The camera according to claim 1, wherein a quantity of the first sliding block and a quantity of the second sliding block are plural, and each first sliding block corresponds to each second sliding block.

3. The camera according to claim 1, wherein a quantity of the first sliding block and a quantity of the second sliding block are each equal to 3, and the first sliding blocks and the second sliding blocks are arranged at equal intervals.

4. The camera according to claim 1, wherein a quantity of the first locking block and a quantity of the second locking block are plural, and each first locking block corresponds to each second locking block.

5. The camera according to claim 1, wherein a quantity of the first locking block and a quantity of the second locking block are each equal to 3, and the first locking blocks and the second locking blocks are arranged at equal intervals.

6. The camera according to claim 1, wherein a second sliding chute is further arranged on the inner side wall of the second shell; the first shell is further provided with a first convex block; and the first convex block is arranged in the second sliding chute.

7. The camera according to claim 6, wherein a quantity of the first second sliding chute and a quantity of the first convex block are plural, and each second sliding chute corresponds to each first convex block.

8. The camera according to claim 6, wherein a quantity of the second sliding chute and a quantity of the first convex block are equal to 2, and the second sliding chutes and the first convex blocks are arranged at equal intervals.

9. The camera according to claim 1, wherein the lens cover further comprises a lens piece; the lens cover is provided with a lens hole; and the lens piece is covered at the lens hole.

10. The camera according to claim 9, wherein the lens cover further comprises a first gasket; and the first gasket is arranged between the lens piece and the second shell.

11. The camera according to claim 1, wherein the lens cover further comprises a second gasket; the second shell is provided with a gasket groove; the gasket groove is arranged around the ring wall in a surrounding manner; and the second gasket is arranged in the gasket groove.

12. The camera according to claim 1, wherein a friction portion is arranged on an outer side wall of the second shell.

13. The camera according to claim 12, wherein the friction portion comprises a strip-like bulge; and a quantity of the strip-like bulge is plural.

14. The camera according to claim 13, wherein the strip-like bulges are uniformly distributed on the second shell.

15. The camera according to claim 1, wherein one end of the first sliding block is a first guide slope, and one end of the second sliding block is a second guide slope.

16. A camera, comprising a first shell, a lens arranged on the first shell, a lens cover, and a sealing ring, wherein the first shell is provided with a first connection portion and a first locking portion; a second connection portion and a second locking portion are arranged on an inner side wall of the lens cover; the first connection portion is slidably connected to the second connection portion; when the first locking portion is locked with the second locking portion, relative sliding between the first connection portion and the second connection portion is limited, so that the lens cover and the lens reach a locked state; when the first locking portion is separated from the second locking portion, the first connection portion and the second connection portion are allowed to slide relatively, so that the lens cover and the lens reach a released state; and the sealing ring is arranged on the first shell around the lens in a surrounding manner and abuts against the lens cover;

wherein the first locking portion comprises a first locking block; the first locking block is arranged on the first shell; the second locking portion comprises a second locking block; the lens cover comprises a second shell; the second locking block is arranged on an inner side wall of the second shell; and the first locking block is locked with the second locking block;

wherein two ends of the first locking block are provided with a first locking slope and a third guide slope; two ends of the second locking block are provided with a second locking slope and a fourth guide slope; and the first locking slope is engaged with the second locking slope.

* * * * *